United States Patent [19]

Kamiyama et al.

[11] Patent Number: 6,123,109
[45] Date of Patent: Sep. 26, 2000

[54] BRANCH PIPE LINING BAG AND PIPE LINING METHOD

[75] Inventors: Takao Kamiyama, Kanagawa-ken; Yasuhiro Yokoshima; Shigeru Endoh, both of Ibaraki-ken; Hiroyuki Aoki, Saitama-ken, all of Japan

[73] Assignees: Shonan Gosei-Jushi Seisakusho K.K., Hiratsuka; Yokoshima & Company, Ibaraki-ken; GET Inc., Tsukuba; OAR Company, Tokorozawa, all of Japan

[21] Appl. No.: 09/238,835

[22] Filed: Jan. 28, 1999

[30] Foreign Application Priority Data

Feb. 4, 1997 [JP] Japan .................................. 9-021513
Jan. 28, 1998 [JP] Japan ................................. 10-015979

[51] Int. Cl.[7] .................................................... F16L 55/16
[52] U.S. Cl. ........................... 138/98; 138/97; 405/150.1; 156/287; 264/269
[58] Field of Search ....................... 138/98, 97; 264/269; 156/287; 405/150.1

[56] References Cited

U.S. PATENT DOCUMENTS

| 4,434,115 | 2/1984 | Chick | 264/36 |
|---|---|---|---|
| 5,329,063 | 7/1994 | Endoh | 138/98 |
| 5,439,033 | 8/1995 | Kamiyama et al. | 138/98 |
| 5,454,401 | 10/1995 | Kamiyama et al. | 138/98 |
| 5,566,719 | 10/1996 | Kamiyama et al. | 138/98 |
| 5,692,543 | 12/1997 | Wood | 138/98 |

FOREIGN PATENT DOCUMENTS 2041147  9/1980  United Kingdom.

*Primary Examiner*—Patrick Brinson
*Attorney, Agent, or Firm*—Knobbe, Martens, Olson & Bear, LLP

[57] ABSTRACT

A branch pipe lining bag wherein an annular protective member is previously fixed on a flange which is provided adjoined to an open end of a tubular bag. This tubular bag is soaked with a hardenable liquid resin and adapted to be everted under fluid pressure into a branch pipe. The protective member can be attached on the marginal periphery of the branch pipe opening to the main pipe simultaneously at the end of the branch pipe lining, irrespective of the inner diameter of the main pipe. Also, a pipe lining method wherein the annular protective member fixed on the flange is prepared previously and then the flange is connected to the part of the main pipe where the branch pipe opens. The main pipe lining bag can be bored without any damage irrespective of both the main pipe diameter and the branch pipe diameter or any connecting situations.

28 Claims, 15 Drawing Sheets

BRANCH PIPE LINING BAG AND PIPE LINING METHOD

BACKGROUND OF THE INVENTION

This invention relates generally to a pipe lining technique, and more particularly to a branch pipe lining bag for lining an aged or defective inner wall of a branch pipe joining a main pipe and also to a method for lining these pipes by using the branch pipe lining bag and a main pipe lining bag.

When an underground pipe, such as a sewer pipe, becomes defective or too old to perform properly, the pipe is repaired and rehabilitated without digging the earth to the pipe and disassembling the sections of the pipe. This non-digging method of repairing an underground pipe has been known and practiced commonly in the field of civil engineering.

The pipe lining method utilizes a sufficiently long tubular flexible liner bag made of a resin-absorbent material impregnated with a curable liquid resin such as thermosetting liquid resin, and having the outer surface impermeably covered with a highly air-tight polymeric film. The tubular pipe lining bag is inserted into a pipe to be repaired by means of a pressurized fluid, like air or water, such that the pipe lining bag is turned inside out as it proceeds deeper in the pipe.

More particularly, the tubular flexible liner bag is closed at one end and open at the other. The tubular flexible liner bag is first flattened. Then, the open end of the tubular liner bag is spread open and hooked (anchored) at the end of the defective or aged pipe in a manner such that the opened end of the liner bag completely and fixedly covers and closes the pipe end. A portion of the liner bag in the vicinity of the pipe end is pushed into the pipe so as to create an annular pocket. Then, the pressurized fluid is applied to the annular pocket of the tubular liner bag whereupon the fluid urges the tubular liner bag to enter the pipe.

Since one end of the tubular liner bag is hooked at the end of the pipe, it remains there while the rest of the flexible liner bag is turned inside out under fluid pressure as it proceeds deeper in the pipe. (Hereinafter, this manner of insertion shall be called "everting".) When the entire length of the tubular liner bag is everted (i.e., turned inside out) into the pipe, the everted tubular liner bag is pressed against the inner wall of the pipe by the said pressurized fluid or by an inflatable pressure bag which is newly inserted inside the everted tubular liner bag, and the tubular flexible liner bag is hardened as the curable liquid resin impregnated through the thickness of the liner bag is cured (by heating in the case a thermosetting resin). Thereafter the closed end of the liner bag is cut off. It is thus possible to line the inside wall of the defective or old pipe with a rigid liner without digging the ground and disassembling the pipe sections.

This pipe lining method is similarly applicable to a branch pipe that is in fluid communication with a main pipe such as sewer pipes. We have formerly proposed a branch pipe lining method wherein a branch pipe is internally lined with a branch pipe liner bag having a flange at its opening end. More particularly, according to this method, the branch pipe liner bag is positioned in the main pipe and the flange of the branch pipe liner bag is fitted closely on the periphery of the opening, which is made in the wall of the main pipe and defined by a lower end of the branch pipe. The branch pipe liner bag is, then, everted into the branch pipe under fluid pressure so that the liner bag goes up toward the surface of the ground. When the eversion is completed and the liner bag is closely pressed against the inner face of the branch pipe, the curable liquid resin impregnated through the branch pipe liner bag is hardened by heating or some other procedure.

After the branch pipe is internally lined by this branch pipe lining method, the main pipe is then lined with a main pipe liner by the conventional pipe lining method as described above. However, since this main pipe liner closes the opening to the branch pipe, it is necessary to bore the main pipe liner so as to connect the main pipe and the branch pipe with each other.

If, however, the inner diameter of the main pipe is smaller than 800 mm or so, a person cannot enter the main pipe and it is necessary to use a borer robot with a cutter, which is introduced into the main pipe in place of a person, by remotely controlling on the ground to bore the main pipe liner.

However, it requires much skill to properly control the borer robot in such an operation, and when the operator is not very careful, the robot's cutter may attack the flange and other portions of the branch pipe liner which are not intended to be removed. When such inadvertent cutting causes breaks, ground water would penetrate through them into the pipes to cause problems. In certain special cases wherein a connection of the branch pipe to the main pipe is of such configuration that renders the boring difficult, damages on the branch pipe liner by the cutter were unavoidable.

It was conceived, accordingly, to protect a periphery of the branch pipe liner with a protective member at a portion adjacent to the flange, after lining of the branch pipes. However, if the main pipe has an inner diameter less than 800 mm that allows no person to enter thereto, it is impossible to attach the protective member by person.

It is, therefore, a principal object of this invention to provide an improved branch pipe lining bag.

It is another object of this invention to provide a branch pipe lining bag which can be equipped with the protective member simultaneously with completion of the branch pipe lining, irrespective of the inner diameter of the main pipe.

On the other hand, the portion of the main pipe lining bag that needs the boring shapes an arc or curved face. Due to this shape, the cutting depth varies corresponding to diameters of the main pipe and the branch pipe and further to cutting points around a periphery of the branch pipe opening. As a result, the cutter enters too deeply into the branch pipe lining bag. This requires the protective member to be between 20 mm and 100 mm in height and to push such a protective member into the branch pipe.

However, the protective member is made of metal or hard materials. Also, if, as shown in FIG. 16, the branch pipe 111 is connected to the main pipe 110 with an angle (for example, =45° or 60°) or, as shown in FIG. 17, the branch pipe 201 is connected to the main pipe 210 through a 45°, 60° or 90° elbow, it is impossible to set such a long height protective member completely.

It is, therefore, a further object of this invention to provide an improved pipe lining method.

It is still further object of this invention to provide a pipe lining method whereby the main pipe lining bag can be bored without any damage irrespective of both the main pipe diameter and the branch pipe diameter or any connecting situations.

The above and other objects, features and advantages of this invention will become apparent from the following detailed description of the preferred embodiments thereof when read in conjunction with the accompanying drawings.

SUMMARY OF THE INVENTION

This invention is adapted to be embodied in a branch pipe lining bag. The branch pipe lining bag comprises a flexible tubular bag soaked with a hardenable liquid resin and adapted to be everted under fluid pressure into a branch pipe so as to extending upwardly from a main pipe toward the ground, a flange being adjoined to an open end of said tubular bag, an fluid-tight film bag in which said tubular bag is contained in a manner such that at least a most part of an outer face, before eversion, of the tubular bag is covered with said film bag, and an annular protective member being fixed on said flange.

In accordance with a first feature of the invention, the annular protective member is fixed on the flange adjoined to the open end of the tubular bag so that the protective member can be attached on the marginal periphery of the branch pipe opening to the main pipe simultaneously at the end of the branch pipe lining, irrespective of the inner diameter of the main pipe.

Also, another feature of the invention is adapted to be embodied in a pipe lining method. The pipe lining method comprises the steps of (a) preparing a branch pipe lining bag having a flexible tubular bag soaked with a hardenable liquid resin and adapted to be everted under fluid pressure into a branch pipe, a flange being adjoined to an open end of said tubular bag, an fluid-tight film bag in which said tubular bag is contained in a manner such that at least a most part of an outer face, before eversion, of the tubular bag is covered with said film bag, and an annular protective member being fixed on said flange, (b) connecting said flange to a part of said main pipe where a branch pipe opens to the main pipe, (c) everting said tubular bag under fluid pressure into said branch pipe so as to extending upwardly from a main pipe to the ground, (d) curing said liquid resin to harden said tubular bag while the tubular bag is everted, (e) lining the main pipe with a main pipe liner and (f) boring a part of the main pipe liner where said branch pipe opening exists.

According to this invention, the annular protective member fixed on the flange is prepared previously and then the flange is connected to the part of the main pipe where the branch pipe opens so that the main pipe lining bag can be bored without any damage irrespective of both the main pipe diameter and the branch pipe diameter or any connecting situations.

BRIEF DESCRIPTION OF THE DRAWINGS

DETAILED DESCRIPTION OF THE PREFERRED EMBODIMENTS OF THE INVENTION (First Embodiment: FIGS. 1–8)

Figure 1:
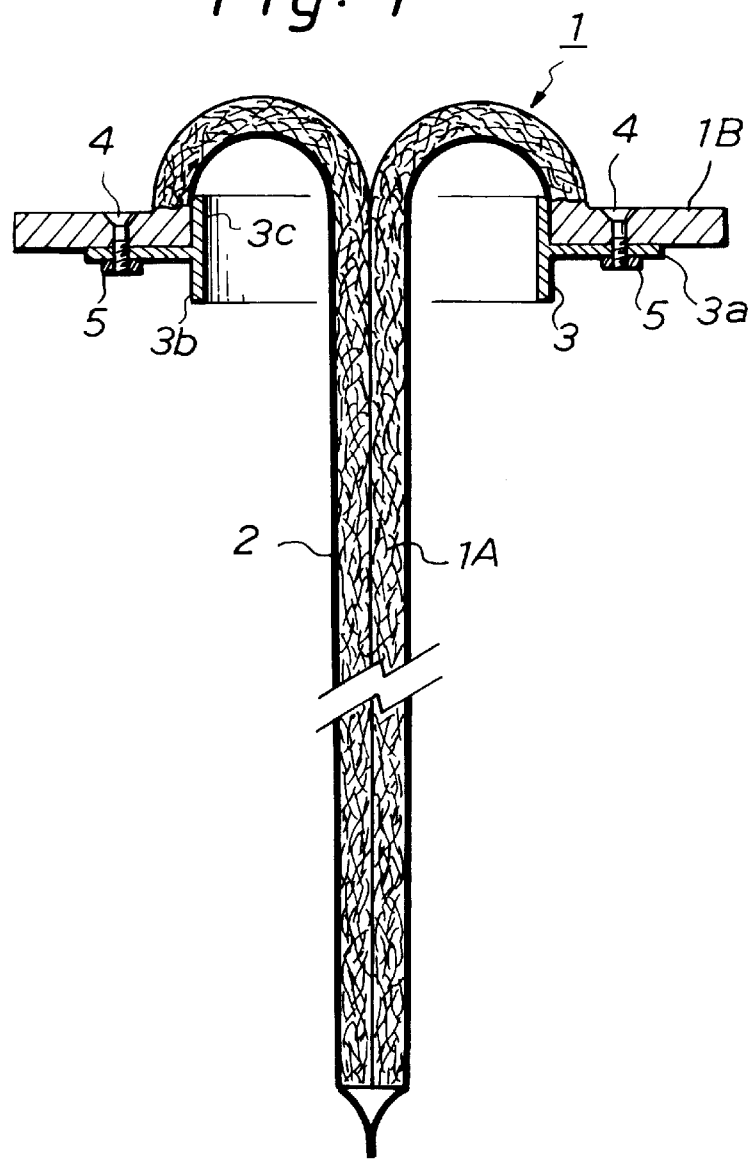
FIG. 1 is a cross-sectional view illustrating a branch pipe lining bag according to a first embodiment of the invention.

In this first embodiment, the branch pipe lining bag 1 comprises a hardenable liquid resin-containing flexible member 1A, which is a tubular liquid resin-absorbable material soaked with an uncured hardenable liquid resin, a rigid flange 1B formed by turning an open end of the tubular liquid resin-absorbable fabric material inside out and hardening a peripheral portion of the turned part of the material, a highly air-tight polymeric film 2, which covers up the entire periphery of the hardenable liquid resin-containing member 1A and that face (inner circumferential face, as seen in FIG. 1) of a portion of the flange 1B which is immediately continuous from an end of the outer face of the member 1A, and an annular protective member 3, which is attached on a periphery of the flange 1B. The lower end of the hardenable liquid resin-containing member 1A of the branch pipe lining bag 1 is airtightly sealed with the polymeric film 2.

The above-mentioned tubular liquid resin-absorbable material is a non-woven texture obtained by bonding or punch-pressing a mass of fiber such as of polyester, polypropylene, and acrylic polymer. The uncured hardenable liquid resin to impregnate the fabric material is selected from thermosetting resins such as unsaturated polyester, epoxy, and vinyl ester. The polymeric film 2 is prepared in the form of a single layer or multi-layer seamless tube by the inflation method, and is made of a material such as polyurethane, polyethylene, nylon, ethylene vinyl alcohol, Admer (the name of a commercial product), ionomer and polyvinyl chloride. Also, the polymeric film 2 is attached to the surfaces of the hardenable liquid resin-containing member 1A and the flange 1B by welding, bonding or coating.

Figure 3:
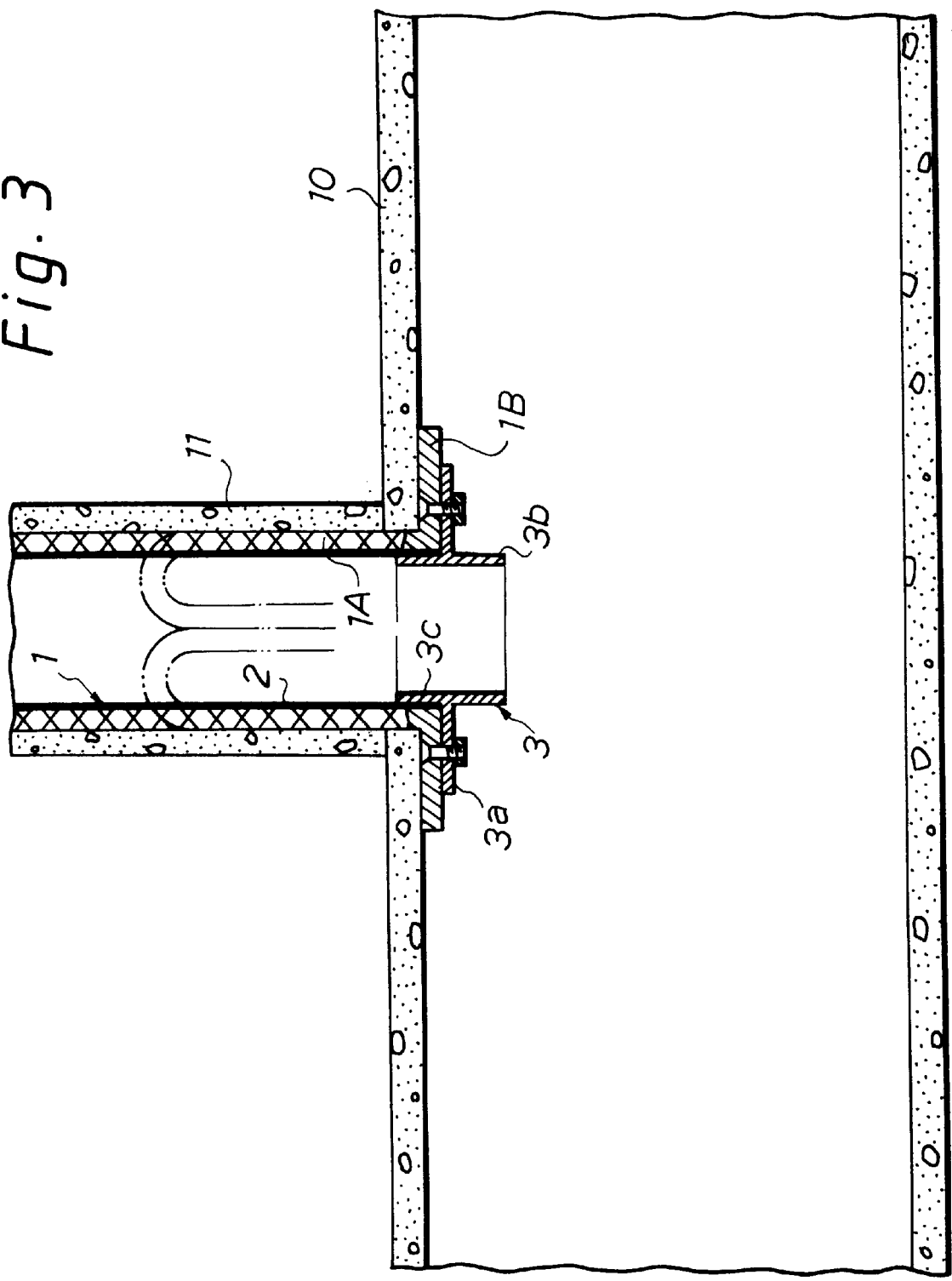
FIGS. 3 through 7 are cross-sectional views illustrating in order various steps of a pipe lining method according to the first embodiment.

Further, the flange 1B of the branch pipe lining bag 1 is preferably prepared before the tubular liquid resin-absorbable material is impregnated with the liquid resin. As described above, the upper end portion of the tubular liquid resin-absorbable material is turned inside out and is impregnated with a liquid thermosetting resin such as unsaturated polyester resin, epoxy resin, vinyl ester resin, phenolic resin, urethane resin, and silicone resin, and the flange 1B is hardened after it is flexed to have a curvature that is nearly equal to the curvature of the inner wall of a main pipe 10 (ref. FIG. 3).

Figure 2:
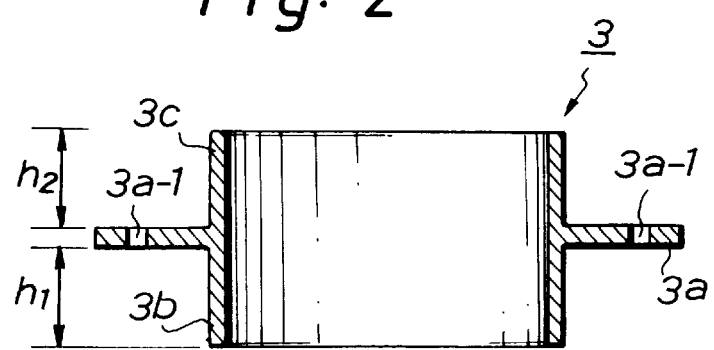
FIG. 2 is a cross-sectional view illustrating a cutting protection member according to first embodiment.

The protective member 3 is made of a metal such as stainless steel (SUS), and, as shown in FIG. 2, the flange 3a extends outwardly from the middle part of the cylindrical body and has a curvature that is shaped along the curvature of the flange 1B, and a plurality of openings 3a-1 are made through the flange 3a. The upper face of the flange 3a of the protective member 3 is joined with the lower face of the flange 1B (as seen in FIG. 1), and this joint is effected by bolts 4, which are put through the flange 1B and the respective holes of the flange 3a and are tightly screwed into respective nuts 5. In this joint structure, the lower portion 3b of the protective member 3 having the height h1 protrudes from the flange 1B and the upper portion 3c having the height h2 protects a part of the periphery of the hardenable liquid resin-containing member 1A before everted. The height h1 and the height h2 of the protective member 3 is set to a value in the range of 10 to 50 mm.

Next, we will explain how the pipe lining method of the present invention is carried out by using FIGS. 3 through 7.

In FIG. 3, the reference numeral 10 designates an underground main sewer pipe, and the reference numeral 11 designates a branch pipe, which meets the main pipe 10 for allowing fluid within to flow into the main pipe 10. The inner diameter of the branch pipe 11 is smaller than that of the main pipe 10. The main pipe 10 is internally lined with a main pipe liner 6, described later, after the branch pipe 11 is internally lined with the use of the branch pipe lining bag 1. Thereafter, the portion of the main pipe liner 6 which closes the branch pipe opening is bored off.

First, we will describe how the branch pipe 11 is lined.

The branch pipe 11 is lined with the branch pipe lining bag 1, shown in FIG. 1. The branch pipe lining bag 1 is introduced into the main pipe 10 by means of a remote-controlled robot, not shown. Then, as shown in FIG. 3, after the flange 1B is attached closely to the branch pipe opening, the resin-containing flexible member 1A is everted into the branch pipe 11 under fluid pressure such as air pressure so that the tubular liner bag goes upwardly from the main pipe toward the ground surface.

When the everting is finished throughout the entire length of the branch pipe 11, fluid pressure is given to inside of the branch pipe lining bag 1 so that the resin-containing flexible member 1A is inflated and pressed against the inner wall of the branch pipe 11. At this stage, the resin-containing flexible member 1A is heated so that the thermosetting resin impregnated therein is cured to harden. Thus, the branch pipe 11 is internally lined with the hardened resin-containing member 1A, and the branch pipe 11 is repaired.

When the lining of the branch pipe 11 is completed, as shown in FIG. 3, one part 3b of the protective member 3 protrudes into the main pipe 10 and the other part 3c protects the flange 1B and the resin-containing member 1A which is immediately continuous from the flange 1B.

Figure 4:
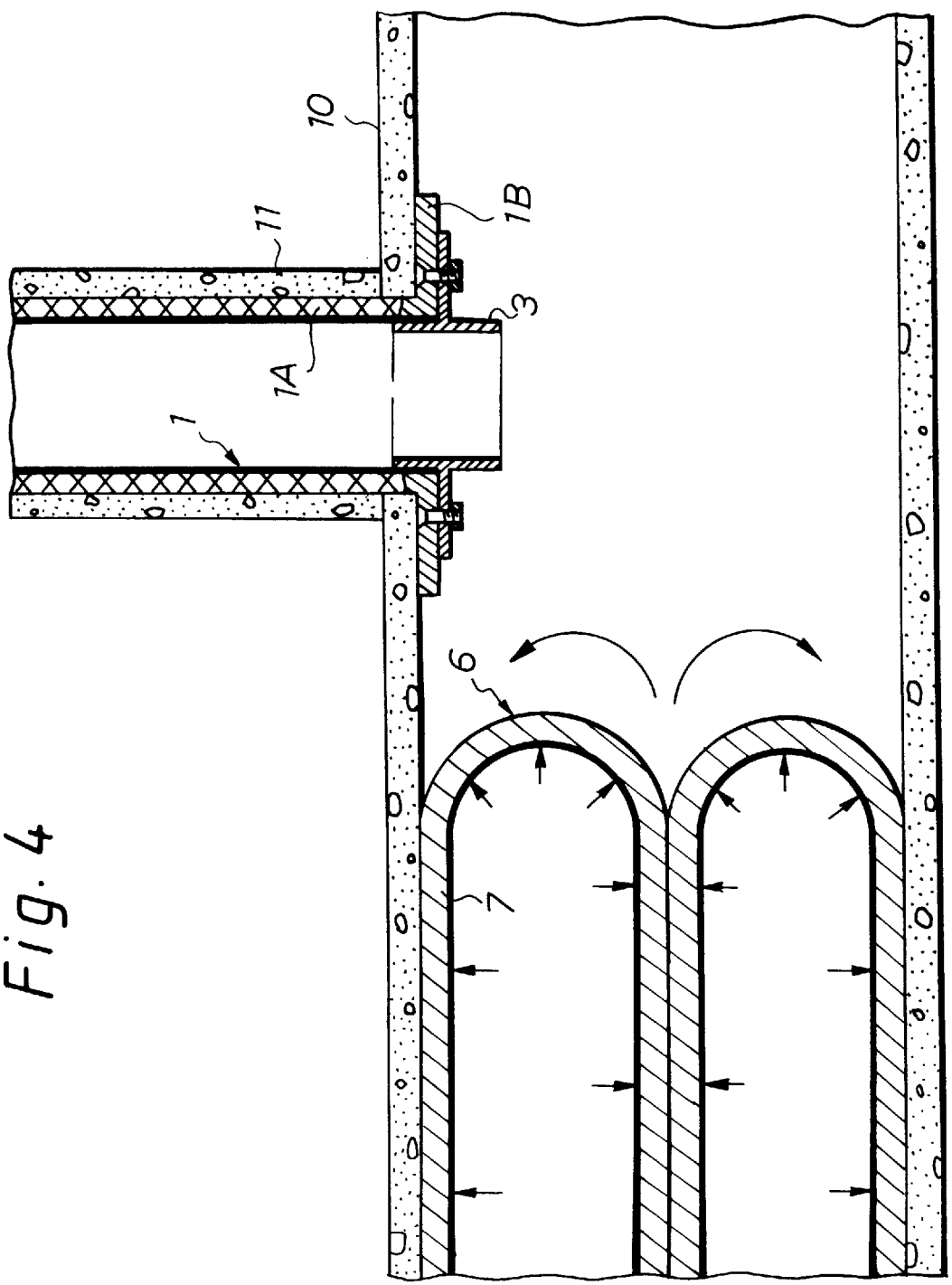

After the completion of the branch pipe lining, the main pipe 10 is lined next. As shown in FIG. 4, the main pipe liner 6 is inserted by eversion into the main pipe 10 under fluid pressure such as air pressure. The main pipe liner 6 consists of a tubular resin-absorbable material impregnated with an uncured hardenable liquid resin and a highly airtight polymeric film 7, which covers up the periphery of the tubular fabric material. The polymeric film 7, the tubular resin-absorbable material and the hardenable liquid resin constituting the main pipe liner 6 are identical to those used in the branch pipe lining bag 1.

Figure 5:
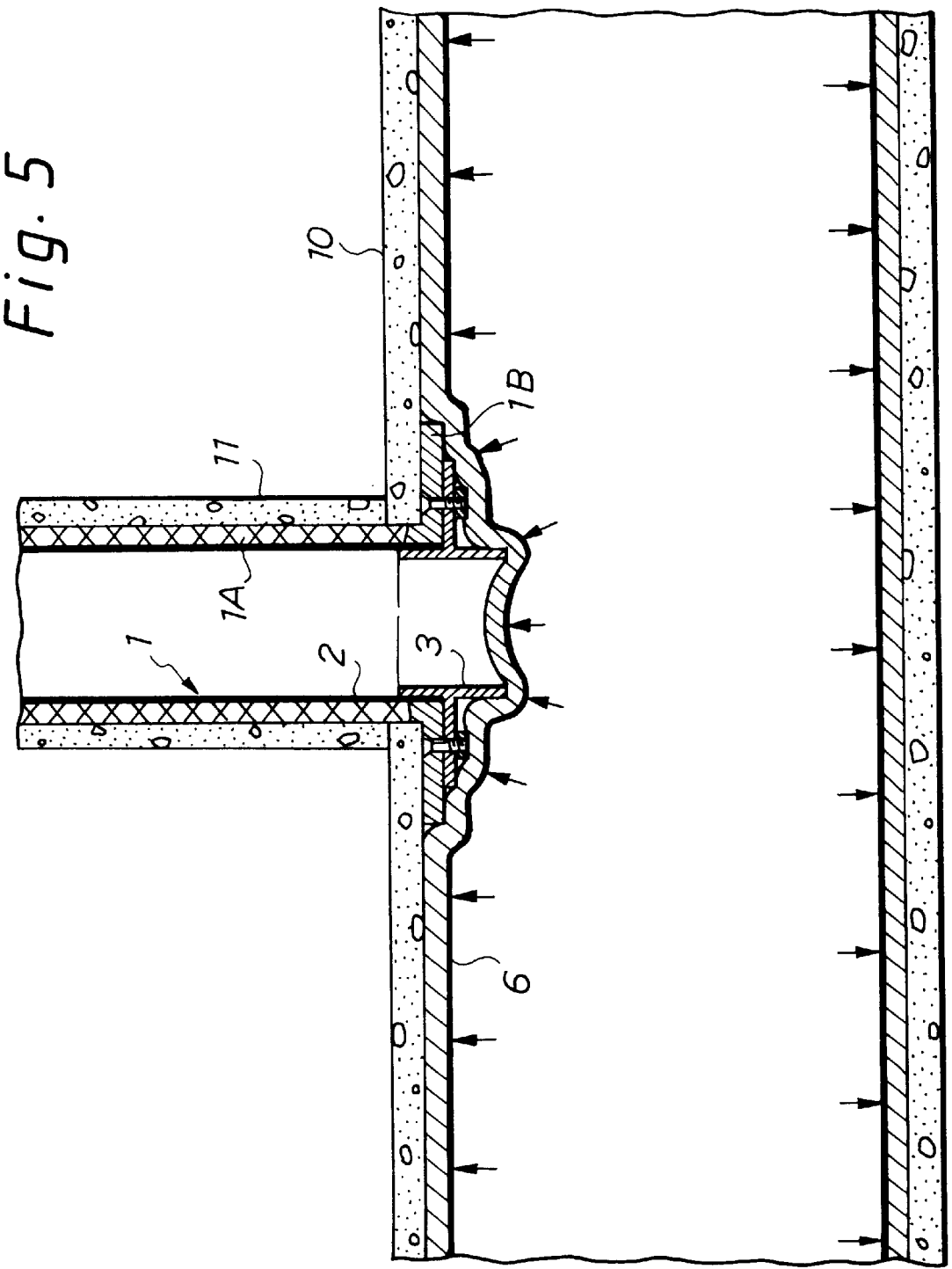

When the everting is finished throughout the entire length of the main pipe 10, as shown in FIG. 5, fluid pressure is given to inside of the main pipe lining bag 6 so that the main pipe liner 6 is inflated and pressed against the inner wall of the main pipe 10. At this stage, the main pipe liner 6 is heated by means of a heating procedure, which may be selected from any conventional methods, so that the thermosetting resin impregnated in the main pipe liner 6 is cured to harden. Thereupon, the main pipe 10 is internally lined with the hardened main pipe liner 6, and the main pipe 10 is repaired. The flange 1B of the branch pipe 11 is substantially joined by the main pipe liner 6 and forms an integral liner with the main pipe liner 6.

Figure 6:
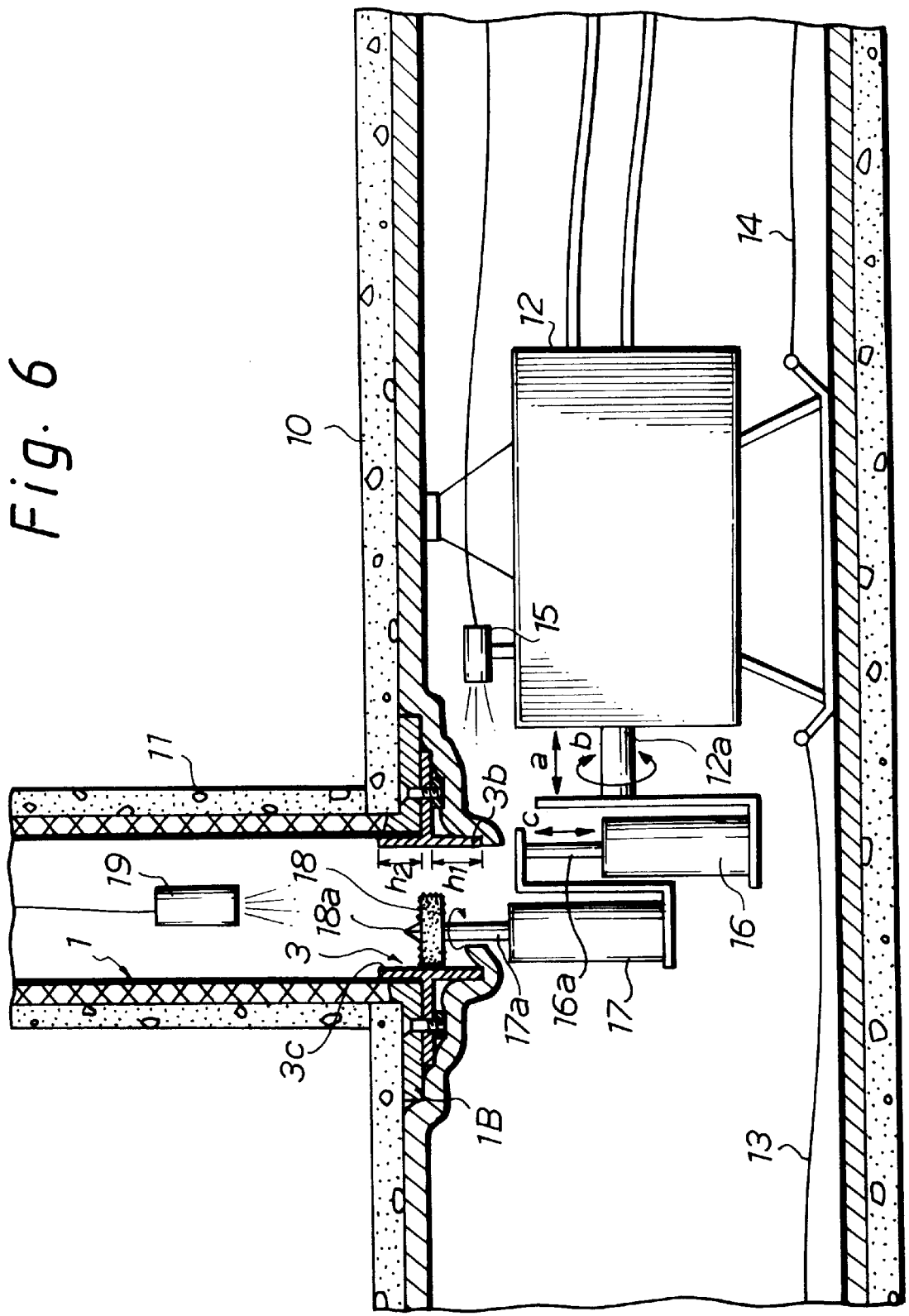

At this stage, the main pipe liner 6 closes the branch pipe opening toward the main pipe 10. Accordingly, it is necessary to make a hole through the main pipe liner 6 to connect the main pipe 10 and the branch pipe 11 with each other, as shown in FIG. 6.

With reference to FIG. 6 again, an on-the-sleigh borer robot 12 is introduced inside the main pipe 10 in order to bore the main pipe liner 6. This borer robot 12 has a horizontal head rod 12a, which is hydraulically driven to reciprocate in the directions shown by a double-pointed arrow a, and also to spin round as shown by a double-pointed circular arrow b. One pull rope 13 is tied at the front part of the sleigh of the robot 12, and another pull rope 14 is tied at the rear part of the sleigh. A TV camera 15 for monitoring is affixed on top of the main body of the robot 12. Further, a hydraulically operated piston cylinder 16 having an upward piston rod 16a is mounted on a stay supported by the head rod 12a of the borer robot 12. The piston rod 16a is adapted to shift vertically as indicated by a double-pointed arrow c, and supports a hydraulically operated motor 17 by means of another stay it holds at its upper end.

Figure 14:
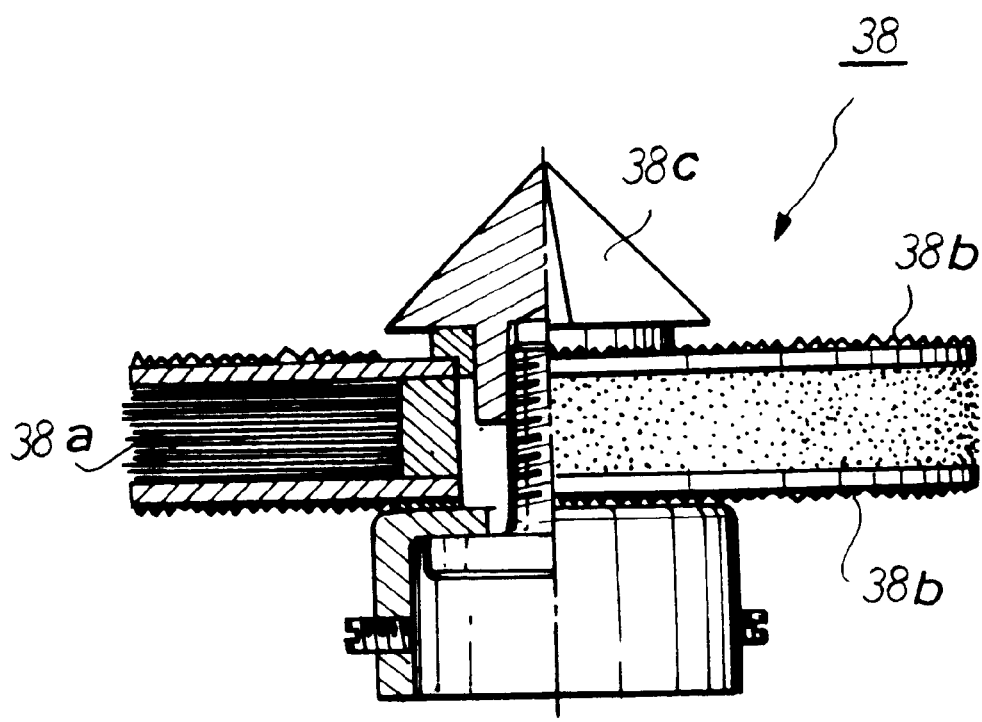
FIG. 14 is a front view of a cutter used in the pipe lining method according to the third embodiment, with a left-hand portion showing a cross-sectional view of the cutter.

A cutter 18 is attached at an end of an upward output shaft 17a of the motor 17. As shown in FIG. 14, the cutter 18 comprises a thick disc-shaped plate having two abrasive faces perpendicular to the central axis and an abrasive peripheral surface of rotation parallel to the central axis, and a tapered reamer 18a, which is provided to form the spire of the assembly 18 rising from the middle of the upper face of the disc-shaped plate. The disc-shaped plate comprises radial wire brush 18b, which is sandwiched between sanding discs 18c, 18c. The outer diameter of the disc-shaped plate is smaller than the inner diameter of the protective member 3.

The borer robot 12 moves in the main pipe 10 by means of the pull rope 13 and the pull rope 14 until the cutter 18 comes to a desired position for the cutting operation. The position of the borer robot 12 is being monitored by means of the TV camera 15 mounted on the robot 12 itself and also another TV camera 19 introduced into the branch pipe 11 on the ground, The motor 17 is driven to spin the output shaft 17a so as to rotate the cutter 18 and at the same time the piston cylinder 16 is driven to push up the piston rod 16a slowly so that the cutter 18 is raised and, as the result, the tapered reamer 18a makes a small hole in the main pipe liner 6, then the abrasive disc-shaped plate bores a big hole. In this regard, by various operations of the head rod 12a, the cutter 18 completes boring of the main pipe liner 6.

In the boring operation, although the wire brush 18b of the cutter 18 briskly erodes the hardened main pipe liner 6, it cannot wear off the metallic protective member 3. Further the protective member 3 protects the resin-containing member 1A as well as the flange 1B of the branch pipe lining bag 1 from being damaged, and thus the conventional problems such as leakage of the ground water through the damaged liner into the pipes never occur.

In this embodiment, since the flange 1B of the branch pipe lining bag 1 is previously provided with the protective member 3, it is feasible to attach the protective member, irrespective of any diameters of the main pipe 10 (even if it is less than 800 mm), at the periphery of the branch pipe opening when the lining of the branch pipe 11 is finished. The protective member 3, therefore, prevents the branch pipe lining bag 1 from being damaged by the cutter 18.

As described above, the lower portion 3b of the protective member 3 protrudes into the main pipe 10 at the height h1. This height h1 gives a supplemental stroke zone to the cutter 18, while the height h2 of the upper portion 3c can be reduced at the height h1 relatively. Thus, it is possible for the cutter 18 to bore the main pipe 6 without damaging the branch pipe lining bag 1, irrespective of the diameters of the main pipe 10 and branch pipe 11 and further connecting situations.

Figure 7:
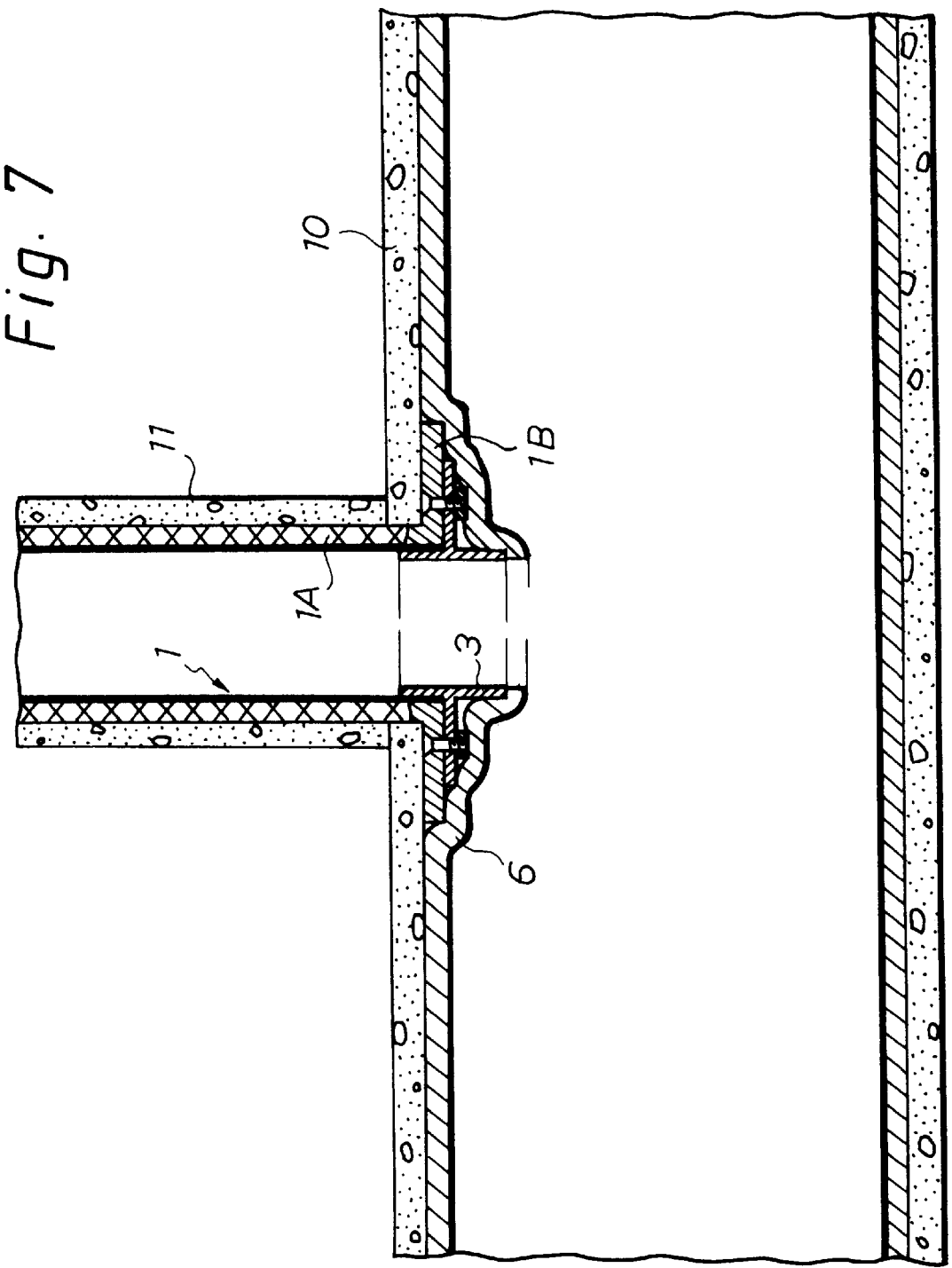

Further, when the portion of the main pipe liner 6, where the branch pipe opening is covered up, is cut off by the cutter 18 in a manner as described above, the branch pipe 11 opens into the main pipe 10 whereby the both pipes communicate with each other via this opening, as shown in FIG. 7. By virtue of the protective member 3, the branch pipe lining bag 1 is perfectly immune from the damaging approach of the cutter 18, so that there will be no breakage in the branch pipe lining bag 1 and no ground water will leak into the main pipe 10 through the branch pipe lining bag 1.

Since the inner diameter of the main pipe 10 is larger than 800 mm, a person can of course attach the protective member 3 at the flange 1B of the branch pipe 11 after lining of the branch pipe 11. Also, as shown FIG. 8, if a plurality of apertures 8 are provided on the flange 1B, the hardenable liquid resin oozing out from the main pipe lining bag 6 during its hardening process may come into the apertures 6 and then hardened. This results more secure connection between the flange 1B of the branch pipe lining bag 1 and the main pipe lining bag 6.

Figure 9:
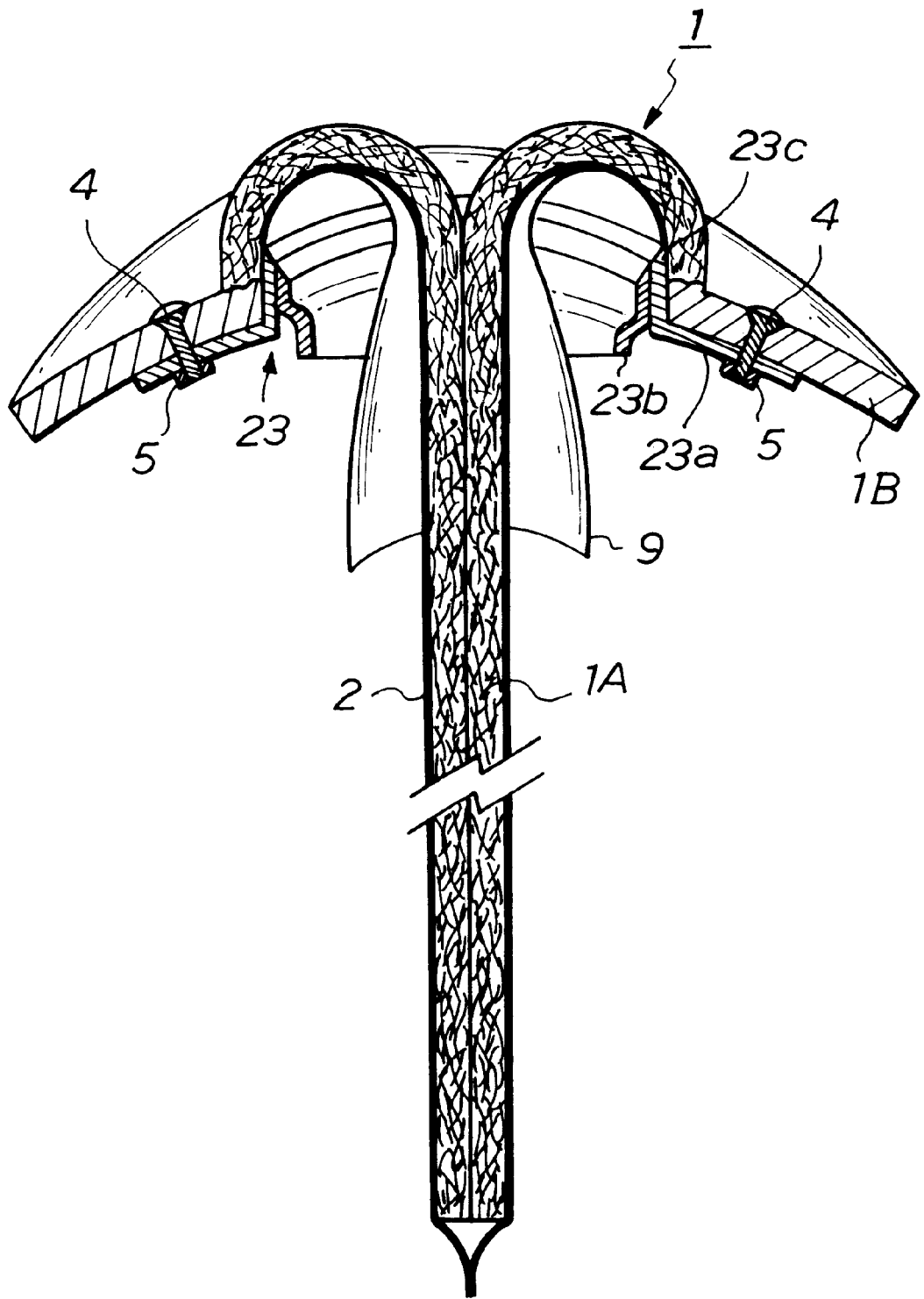
FIG. 9 is a cross-sectional view illustrating a branch pipe lining bag according to a second embodiment of the invention.
Figure 10:
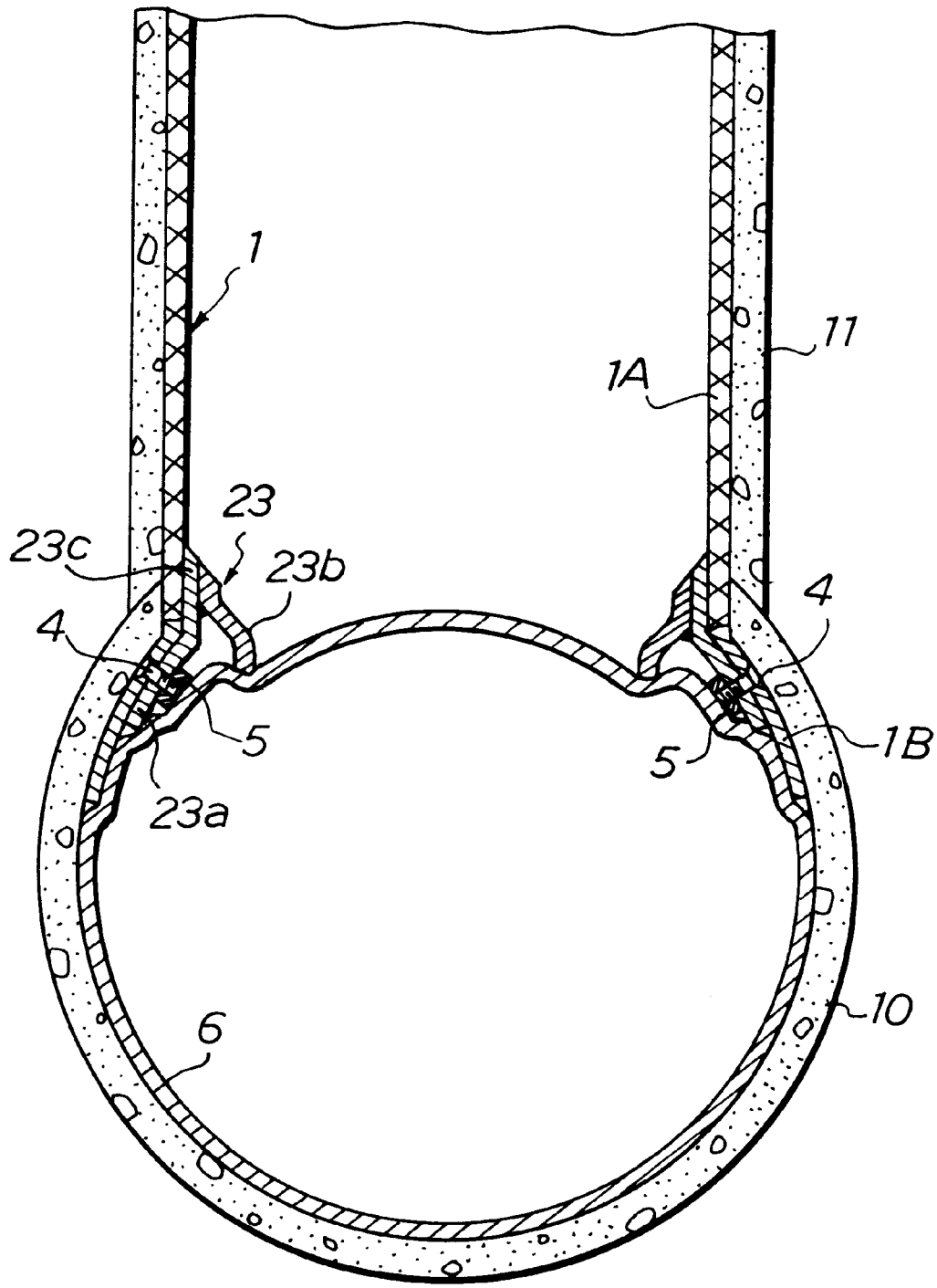
FIGS. 10 and 11 are cross-sectional views illustrating a branch pipe and a main pipe to explain a pipe lining method according to the second embodiment.
Figure 11:
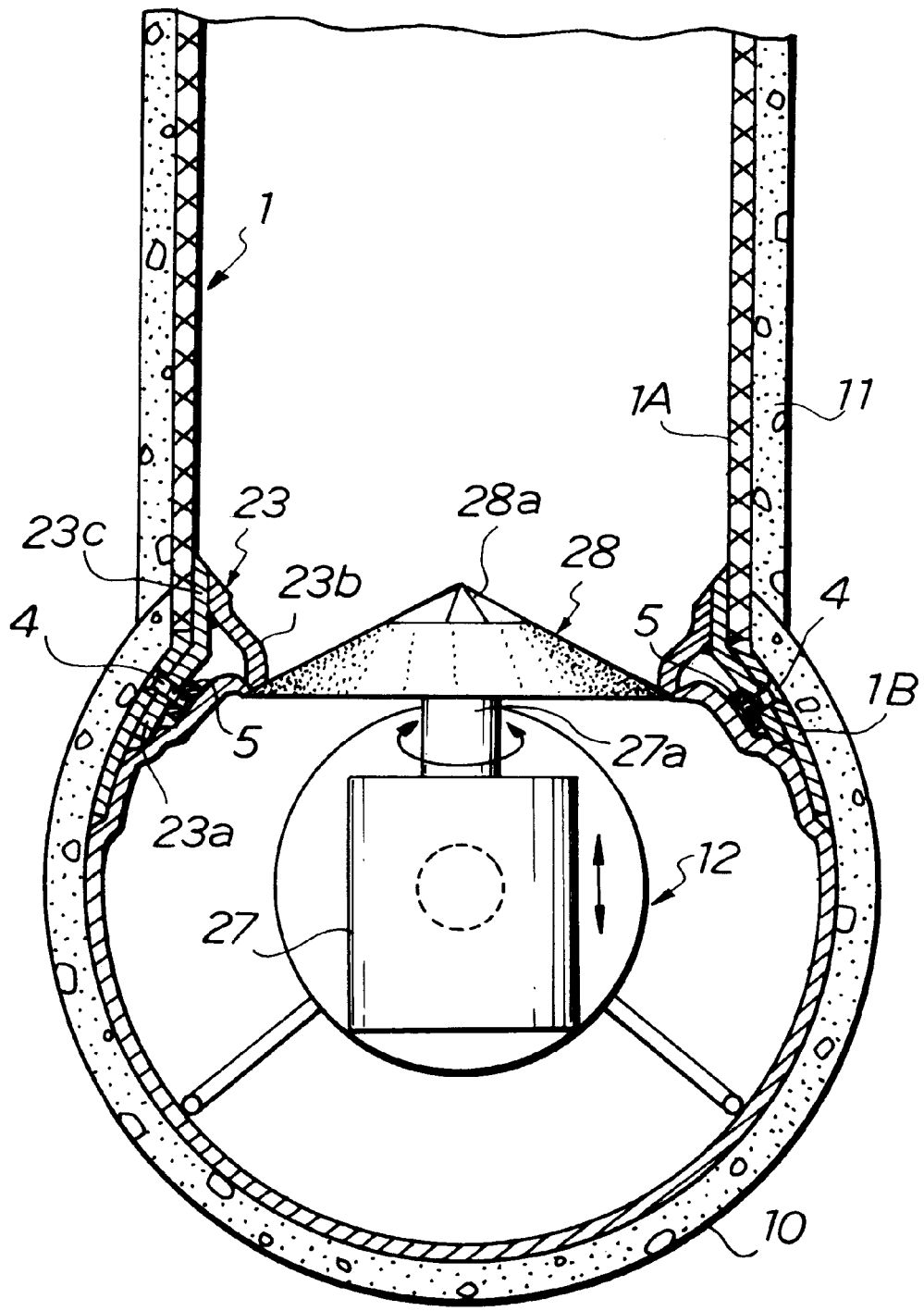

(Second Embodiment: FIGS. 9–11)

In FIG. 9, the same components as shown in FIG. 1 have the same numbers and marks. A protective member 23 made of stainless steel (SUS) consists of a flange 23a and a protective portion 23c. The protective member 23 is mounted on the outer periphery (lower surface in FIG. 9) of the flange 1B of the branch pipe lining bag 1 at the flange 23a with a plurality of bolts 4 and nuts 5. A protruding portion 23b is welded on the inner surface of the protective portion 23c. Also, one end of a tube 9 is tentatively glued with the periphery of the hardenable liquid resin-containing member 1A so as to cover it. The tube 9 is a airtight material and it can be peeled off from the liquid resin-containing member 1A. Additionally, this tube 9 is used when the branch pipe lining bag 1 is everted into the branch pipe 11 under air pressure.

The flange 23a is shaped as an arc along the flange 1B. The height of the protective portion 23c is selected from 10 mm–50 mm. The protruding portion 23b is formed as a step-like shape so as to make the lower portion have narrower diameter than the upper portion and protrudes 10 mm–50 mm below the flange 23a.

We, now, explain the pipe lining method of the second embodiment with FIG. 10 and FIG. 11. The same components as shown in FIG. 3–FIG. 7 have the same numbers and marks.

FIG. 10 shows a situation wherein both of the branch pipe lining and then the main pipe lining are finished. The protective member 23c envelopes the flange 1B and the portion of the hardenable liquid resin-containing member 1A, which is immediately continuous from the flange 1B, so as to protect them. The protruding portion 23b protrudes at the predetermined amount, for example, 10 mm–50 mm.

As the same as described in the first embodiment, since the main pipe lining bag 6 covers the branch pipe opening, it is necessary to make a hole so as to connect the branch pipe 11 and the main pipe 10. As shown in FIG. 11, the borer robot 12 is introduced into the main pipe 10 for this purpose. A motor 27 is mounted on the robot 12 at its tip. The motor 27 has an output shaft 27a and a conical cutter 28 is attached thereon. The cutter 28 consists of a conical cutting tooth and a reamer 28a attached at the top of the cutting tooth. The maximum diameter of the cutter 28 is equal or larger than the tip diameter of the protruding portion 23b of the protective member 23.

The cutter 28 is driven by the motor 27 and moved upwardly with the movement of the motor 27 so as to bore the main pipe lining bag 6. In this operation, when the cutter 28 reaches at the tip of the protruding portion 23b, this portion 23b prevents the cutter 28 from its further moving upwardly and completes the boring operation simultaneously. As the result, smaller cutting stroke for the cutter 28 is merely required.

Apparently, the protective member 23 prevents the flange 1B and the portion of the hardenable liquid resin-containing member 1A, which is immediately continuous from the flange 1B, from being damaged. Further, because of the protrusion of the protective member 23, the cutter 28 requires less cutting stroke inside of the branch pipe 11 and it is possible for the cutter 28 to bore the main pipe 6 without damaging the branch pipe lining bag 1, irrespective of the diameters of the main pipe 10 and branch pipe 11 and further connecting situations.

Figure 12:
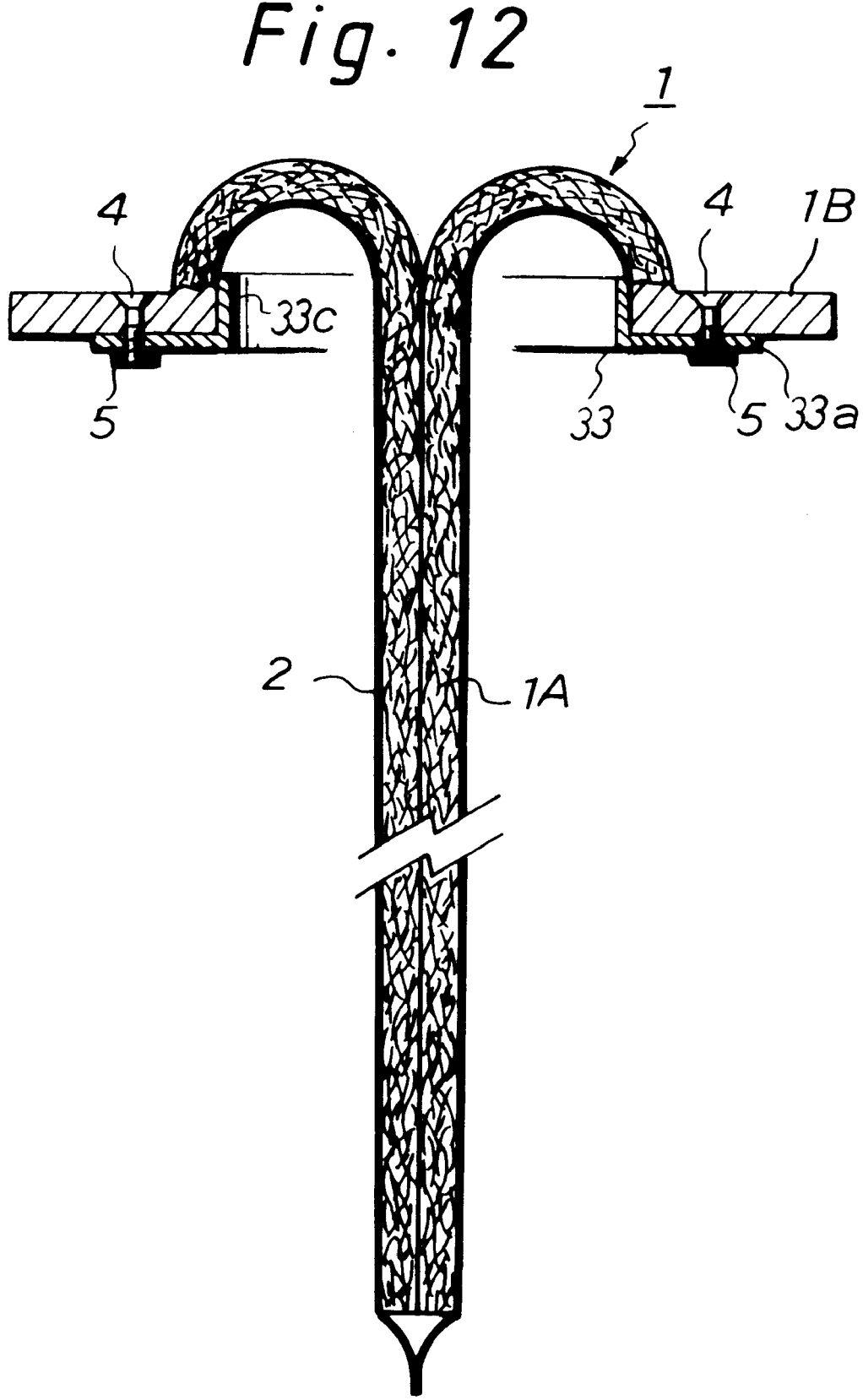
FIG. 12 is a cross-sectional view illustrating a branch pipe lining bag according to a third embodiment of the invention.
Figure 13:
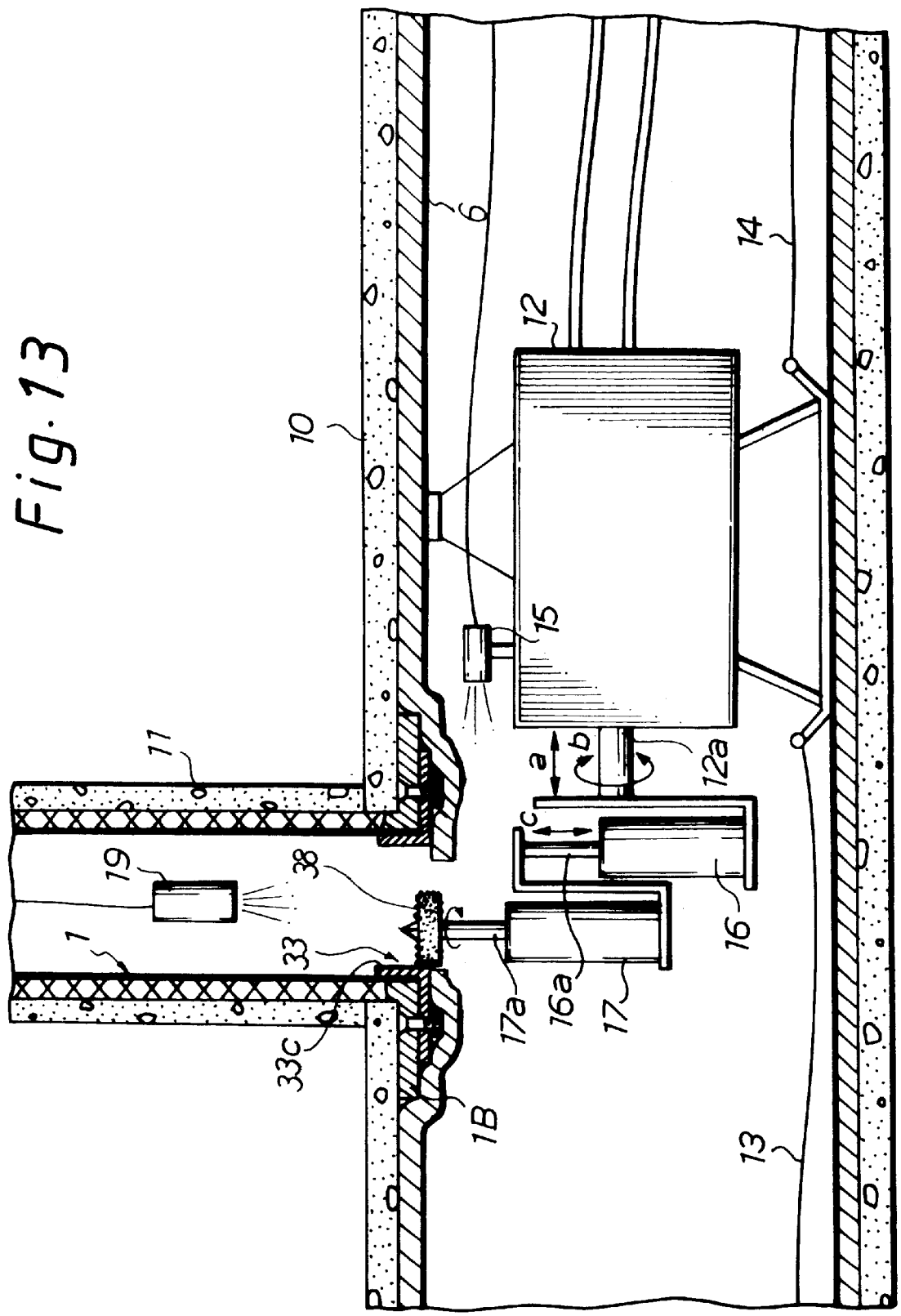
FIG. 13 is a cross-sectional view illustrating a branch pipe and a main pipe to explain a pipe lining method according to the third embodiment.

(Third Embodiment: FIGS. 12–13)

In FIG. 12, the same components as shown in FIG. 1 have the same numbers and marks. A protective member 33 made of stainless steel (SUS) consists of a flange 33a and a protective portion 33c. The protective member 33 is mounted on the periphery of the flange 1B of the branch pipe lining bag 1 at the flange 33a with a plurality of bolts 4 and nuts 5. The flange 33a is shaped as an arc along the flange 1B. The height of the protective portion 33c is selected from 10 mm–50 mm.

The pipe lining method of the third embodiment is illustrated in FIG. 13 and the same components as shown in FIG. 6 have the same numbers and marks. FIG. 13 shows a situation, wherein, after both of the branch pipe lining and then the main pipe lining are finished, the borer robot 12 is introduced into the main pipe 10 so that the cutter 38 of the robot 12 is driven to bore the main pipe lining bag 6 closing the branch pipe opening. The only difference between the both embodiments shown in FIG. 6 and FIG. 13 is that this embodiment has no protrusion from the protective member 33 into the main pipe 10.

Figure 8:
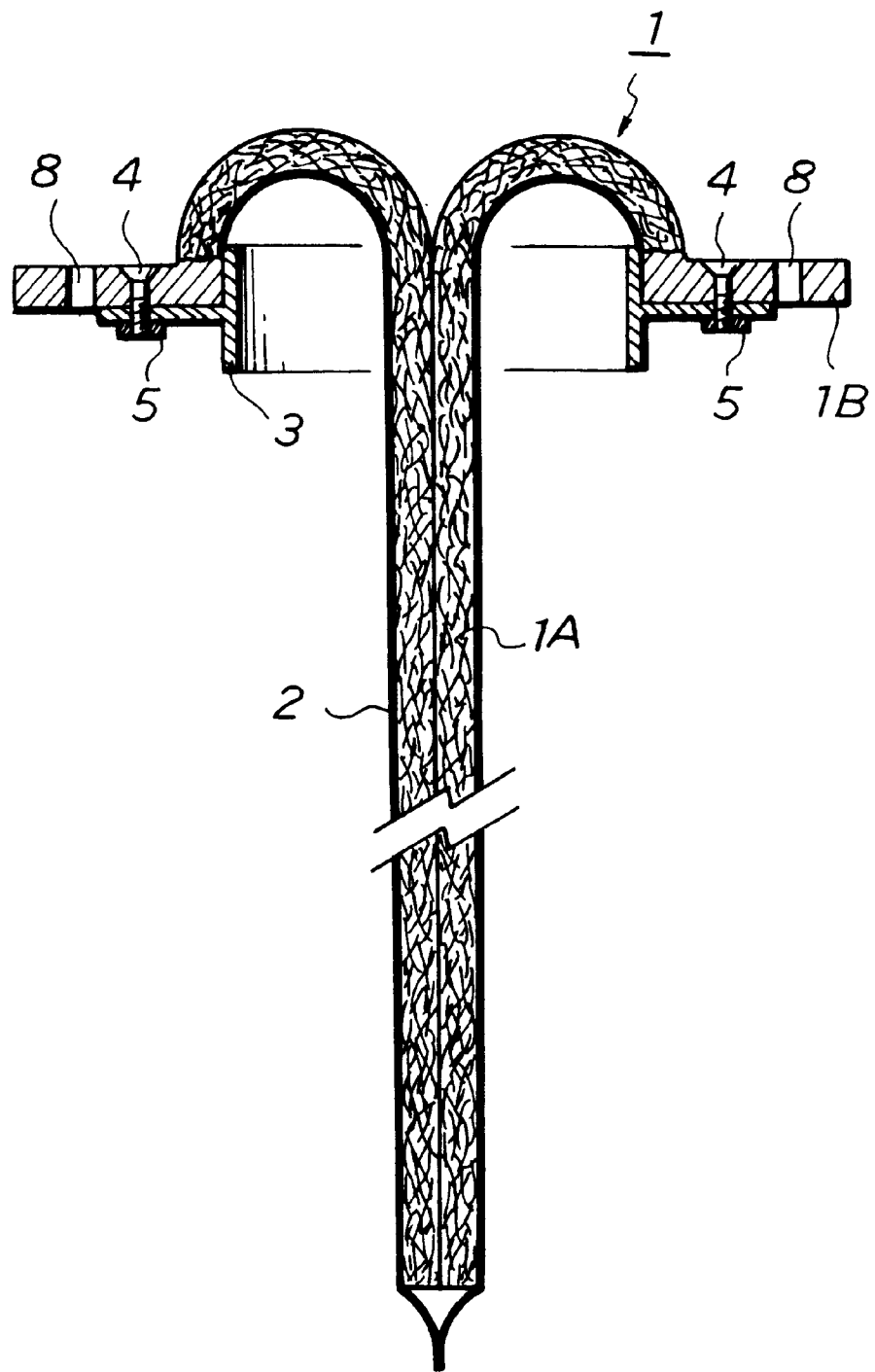
FIG. 8 is a cross-sectional view illustrating a variation of the branch pipe lining bag according to the first embodiment.
Figure 15:
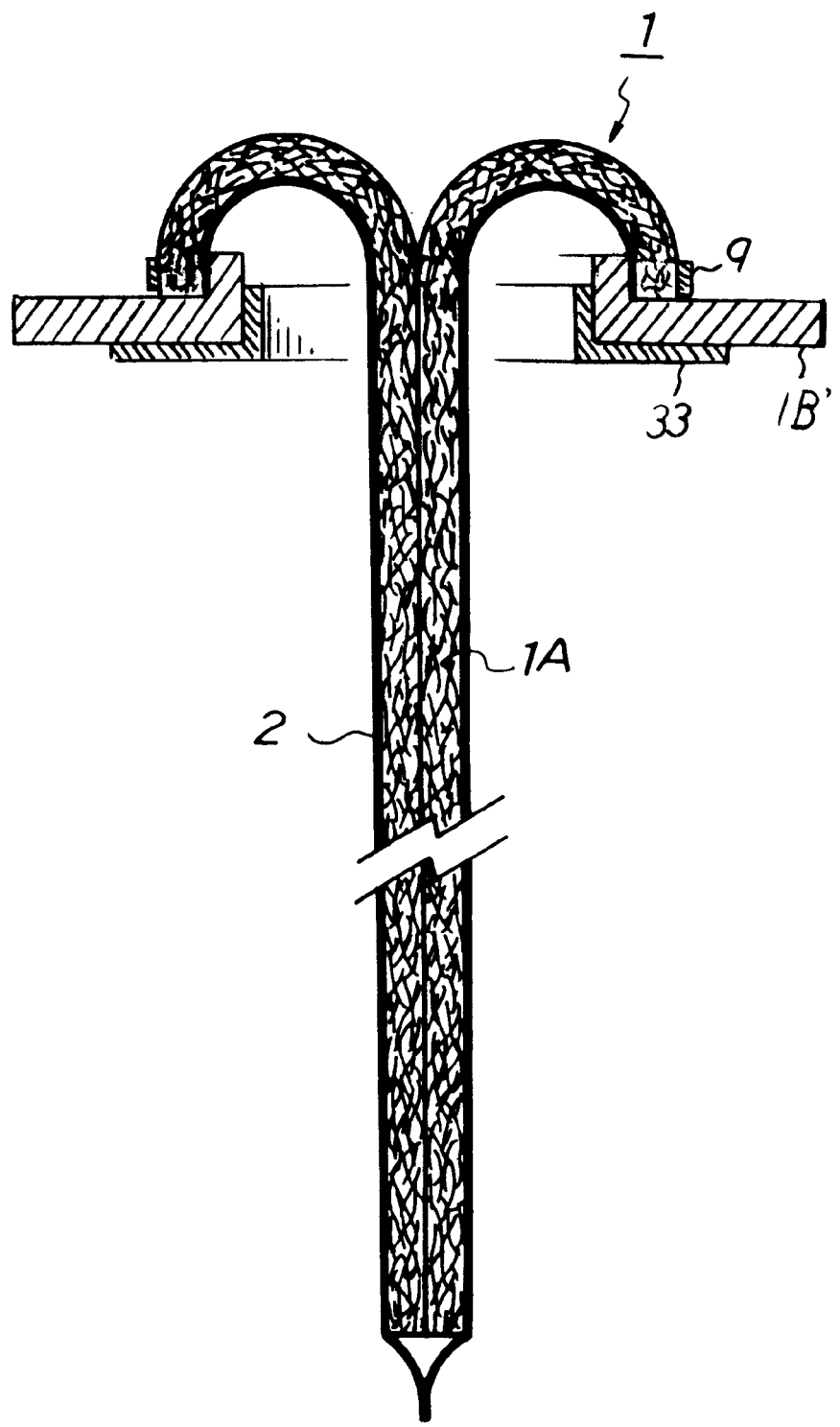
FIG. 15 is a cross-sectional view of an alternative of a branch pipe lining bag.
Figure 16:
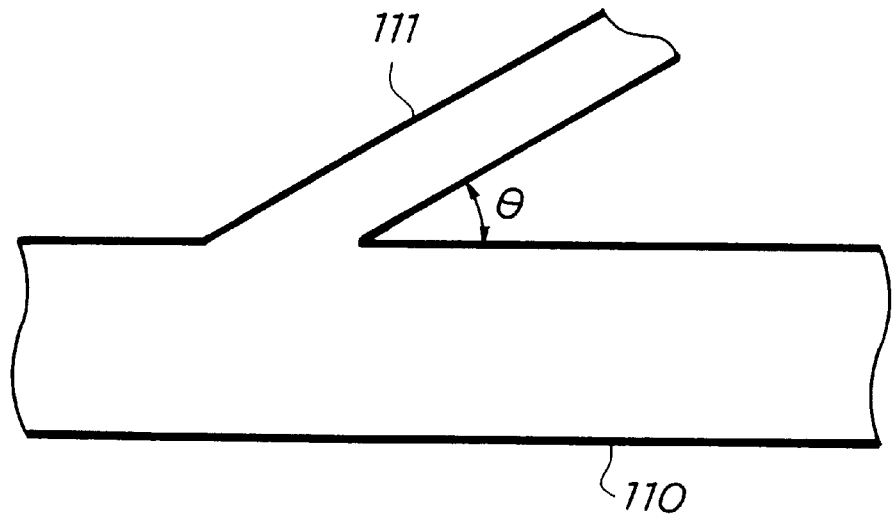
FIGS. 16 and 17 are diagrammatic cross-sectional views illustrating connecting situations between a branch pipe and a main pipe.
Figure 17:
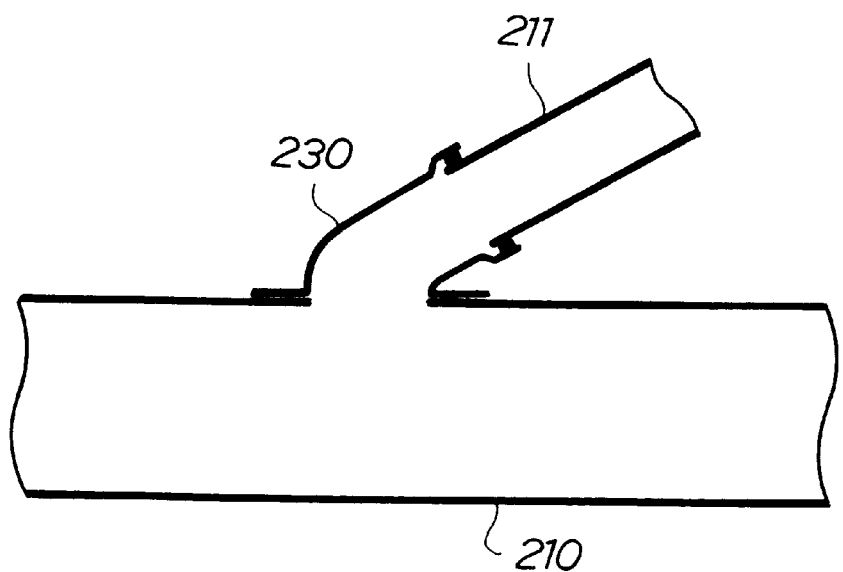

It is also practicable to provide another construction of the branch pipe lining bag 1 as shown in FIG. 15 instead of the first embodiment shown in FIG. 8, the second embodiment shown in FIG. 9 or the third embodiment shown in FIG. 12. In this alternative, a ring 1B' is provided as having the flange function separately from the hardenable liquid resin-containing member 1A and the ring 1B' and the liquid resin-containing member 1A are bound with each other with a rubber band 9. The protective member 33 is fixed on the flange 1B' with any fixing means such as adhesive.

It should be noted that other fluids such as water can be used instead of air to evert and insert the branch pipe lining bag into the branch pipe.

Thus, from the foregoing description it should be readily apparent that the protective member can be attached on the marginal periphery of the branch pipe opening to the main pipe simultaneously at the end of the branch pipe lining, irrespective of the inner diameter of the main pipe. It is also readily apparent that the main pipe lining bag can be bored without any damage irrespective of both the main pipe diameter and the branch pipe diameter or any connecting situations.

While this invention has been described in connection with its preferred embodiments, it is to be understood that various modifications will occur to those skilled in the art without departing from the spirit of the invention. The scope of this invention is therefore to be determined solely by the appended claims.

What is claimed is:

1. A branch pipe lining bag comprising a flexible tubular bag soaked with a hardenable liquid resin and adapted to be everted under fluid pressure into a branch pipe so as to extend upwardly from a main pipe toward the ground, a flange being adjoined to an open end of said tubular bag, an fluid-tight film bag in which said tubular bag is contained in a manner such that at least a most part of an outer face, before eversion, of the tubular bag is covered with said film bag, an annular protective member having a cylindrical portion fitting on an inner peripheral face of said flange and a brim portion spreading out from a mid part of the cylindrical portion, a lower part of the cylindrical portion protruding into said main pipe, and said brim portion being affixed on said flange.

2. A branch pipe lining bag as set forth in claim 1 wherein said flange is formed by turning an open end of said tubular bag inside out and hardening the end portion.

3. A branch pipe lining bag as set forth in claim 1 wherein the cylindrical portion of said annular protective member is fitted also on said tubular bag which is immediately continuous from said flange.

4. A branch pipe lining bag as set forth in claim 2 wherein the open end of said tubular bag is also covered with said film bag.

5. A branch pipe lining bag comprising a flexible tubular bag soaked with a hardenable liquid resin and adapted to be everted under fluid pressure into a branch pipe so as to extend upwardly from a main pipe toward the ground, a flange being adjoined to an open end of said tubular bag, an fluid-tight film bag in which said tubular bag is contained in a manner such that at least a most part of an outer face, before eversion, of the tubular bag is covered with said film bag, an annular protective member being fixed on said flange, said protective member having a cylindrical portion fitting on an inner peripheral face of said flange and a brim portion spreading out from a mid part of the cylindrical portion so that a lower part of the cylindrical portion protrudes into said main pipe, and said lower part of the cylindrical portion having a diameter smaller than a diameter of a upper portion thereof.

6. A branch pipe lining bag as set forth in claim 1 wherein said flange has a plurality of apertures.

7. A branch pipe lining bag as set forth in claim 1 wherein another tube is provided on a periphery of said tubular bag so as to be capable of being peeled off from said tubular bag.

8. A branch pipe lining bag as set forth in claim 1 wherein said annular protective member is made of metal.

9. A branch pipe lining bag as set forth in claim 1 wherein said anuular protective member is fixed on said flange with fastening means.

10. A branch pipe lining bag as set forth in claim 1 wherein said flange is a ring provided separately from said tubular bag and being capable of engaging with the open end of said tubular bag.

11. A branch pipe lining bag as set forth in claim 10 wherein said ring and the open end of said tubular bag is connected with each other.

12. A pipe lining method comprising the steps of (a) preparing a branch pipe lining bag having a flexible tubular bag soaked with a hardenable liquid resin and adapted to be everted under fluid pressure into a branch pipe, a flange being adjoined to an open end of said tubular bag, an fluid-tight film bag in which said tubular bag is contained in a manner such that at least a most part of an outer face, before eversion, of the tubular bag is covered with said film bag, an annular protective member having a cylindrical portion fitting on an inner peripheral face of said flange and a brim portion spreading out from a mid part of the cylindrical portion, a lower part of the cylindrical portion protruding into said main pipe, and said brim portion being affixed on said flange, (b) connecting said flange to a part of said main pipe where a branch pipe opens to the main pipe, (c) everting said tubular bag under fluid pressure into said branch pipe so as to extending upwardly from a main pipe to the ground, (d) curing said liquid resin to harden said tubular bag while the tubular bag is everted, (e) lining the main pipe with a main pipe liner, and (f) boring a part of the main pipe liner where said branch pipe opening exists.

13. A pipe lining method set forth in claim 12 wherein the boring is done with a cutter.

14. A pipe lining method as set forth in claim 13 wherein said annular protective member has a cylindrical portion and said cutter has an outer diameter smaller than the inner diameter of said cylindrical portion.

15. A pipe lining method comprising the steps of (a) preparing a branch pipe lining bag having a flexible tubular bag soaked with a hardenable liquid resin and adapted to be everted under fluid pressure into a branch pipe, a flange being adjoined to an open end of said tubular bag, an fluid-tight film bag in which said tubular bag is contained in a manner such that at least a most part of an outer face, before eversion, of the tubular bag is covered with said film bag, and an annular protective member being fixed on said flange, said annular protective member having a cylindrical portion, (b) connecting said flange to a part of said main pipe where a branch pipe opens to the main pipe, (c) everting said tubular bag under fluid pressure into said branch pipe so as to extending upwardly from a main pipe to the ground, (d) curing said liquid resin to harden said tubular bag while the tubular bag is everted, (e) lining the main pipe with a main pipe liner, (f) boring, with a cutter, a part of the main pipe liner where said branch pipe opening exists, and said cutter being formed as a conical shape such that at least a lower portion thereof having an outer diameter larger than the inner diameter of said cylindrical portion.

16. A pipe lining method as set forth in claim 13 wherein said cutter is movable inside of the cylindrical portion.

17. A pipe lining method as set forth in claim 16 wherein a lower part of said cylindrical portion has a diameter smaller than a upper portion thereof and the lower end of said cylindrical portion prevents the cutter from moving upwardly.

18. A pipe lining method as set forth in claim 13 wherein said cutter is mounted on a robot which is introduced into the main pipe.

19. A pipe lining method as set forth in claim 13 wherein said boring by the cutter is monitored with a TV camera on the ground.

20. A pipe lining method comprising the steps of (a) preparing a branch pipe lining bag having a flexible tubular bag soaked with a hardenable liquid resin and adapted to be everted under fluid pressure into a branch pipe, a flange being adjoined to an open end of said tubular bag, an fluid-tight film bag in which said tubular bag is contained in a manner such that at least a most part of an outer face, before eversion, of the tubular bag is covered with said film bag, and an annular protective member being fixed on said flange, (b) connecting said flange to a part of said main pipe where a branch pipe opens to the main pipe, (c) everting said tubular bag under fluid pressure into said branch pipe so as to extending upwardly from a main pipe to the ground, (d) curing said liquid resin to harden said tubular bag while the tubular bag is everted, (e) lining the main pipe with a main pipe liner, (f) boring, with a cutter, a part of the main pipe liner where said branch pipe opening exists, and said annular protective member being made of metal and said cutter having a wire brush.

21. A branch pipe lining bag as set forth in claim 1 wherein said brim portion is unified with said cylindrical portion.

22. A branch pipe lining bag as set forth in claim 1 wherein a upper portion of the cylindrical portion includes an extending part of the brim portion.

23. A branch pipe lining bag as set forth in claim 22 wherein said extending part of the brim portion is fitted on the inner peripheral face of said flange.

24. A branch pipe lining bag as set forth in claim 1 wherein said lower part of the cylindrical portion has an inner diameter smaller than an inner diameter of said flange.

25. A pipe lining method as set forth in claim 12 wherein said brim portion is unified with said cylindrical portion.

26. A pipe lining method as set forth in claim 12 wherein a upper portion of the cylindrical portion includes an extending part of the brim portion.

27. A pipe lining method as set forth in claim 12 wherein said lower part of the cylindrical portion has an inner diameter smaller than an inner diameter of said flange.

28. A branch pipe lining bag comprising a flexible tubular bag soaked with a hardenable liquid resin and adapted to be everted under fluid pressure into a branch pipe so as to extend upwardly from a main pipe toward the ground, a flange being adjoined to an open end of said tubular bag, an fluid-tight film bag in which said tubular bag is contained in a manner such that at least a most part of an outer face, before eversion, of the tubular bag is covered with said film bag, an annular protective member being fixed on said flange, said annular protective member including a cylindrical portion fitting on an inner peripheral face of said flange, a lower part of the cylindrical portion protruding into said main pipe, and said lower part of the cylindrical portion having an inner diameter smaller than an inner diameter of said flange.

* * * * *